US012522627B2

(12) United States Patent
Wittmann et al.

(10) Patent No.: US 12,522,627 B2
(45) Date of Patent: Jan. 13, 2026

(54) METHOD FOR PRODUCING STABILIZED LIGNIN (71) Applicant: Suncoal Industries GmbH, Ludwigsfelde (DE)

(72) Inventors: Tobias Wittmann, Berlin (DE); Jacob Podschun, Berlin (DE)

(73) Assignee: Suncoal Industries GmbH, Ludwigsfelde (DE)

( * ) Notice: Subject to any disclaimer, the term of this patent is extended or adjusted under 35 U.S.C. 154(b) by 1041 days.

(21) Appl. No.: 17/625,870

(22) PCT Filed: Jul. 10, 2020

(86) PCT No.: PCT/EP2020/069628
§ 371 (c)(1),
(2) Date: Jun. 28, 2022

(87) PCT Pub. No.: WO2021/005230
PCT Pub. Date: Jan. 14, 2021

(65) Prior Publication Data
US 2022/0332744 A1   Oct. 20, 2022

(30) Foreign Application Priority Data
Jul. 10, 2019   (DE) ..................... 10 2019 210 199.2

(51) Int. Cl.
*C07G 1/00*   (2011.01)
(52) U.S. Cl.
CPC ...................................... *C07G 1/00* (2013.01)
(58) Field of Classification Search
CPC ....................................................... C07G 1/00

USPC ......................................................... 530/500
See application file for complete search history.

(56) References Cited

U.S. PATENT DOCUMENTS

| | | |
|---|---|---|
| 4,168,371 A | 9/1979 | Brown |
| 4,332,589 A | 6/1982 | Lin |
| 4,477,611 A | 10/1984 | Sperley |
| 4,598,105 A | 7/1986 | Weber et al. |
| 5,192,361 A | 3/1993 | Schilling |
| 6,172,154 B1 | 1/2001 | Brown et al. |
| 7,064,171 B1 | 6/2006 | Halasa et al. |
| 7,671,126 B1 | 3/2010 | Sandstrom et al. |
| 9,512,376 B2 | 12/2016 | Peus |
| 9,902,816 B2 | 2/2018 | Wittmann et al. |
| 10,611,885 B2 | 4/2020 | Wittmann et al. |

(Continued)

FOREIGN PATENT DOCUMENTS

| | | |
|---|---|---|
| AT | 85234 B | 11/1921 |
| CA | 522715 A | 3/1956 |

(Continued)

OTHER PUBLICATIONS

Steinar et al., DE 19828483 A1 machine translation in English, Jan. 7, 1999. (Year: 1999).*

(Continued)

*Primary Examiner* — David T Karst
(74) *Attorney, Agent, or Firm* — SERVILLA WHITNEY LLC (57) ABSTRACT

The invention relates to a method for producing stabilized lignin from lignin-containing raw materials, comprising two process steps. The invention also relates to the stabilized lignin produced in this way.

17 Claims, 3 Drawing Sheets

(56) References Cited

U.S. PATENT DOCUMENTS

| | | |
|---|---|---|
| 11,306,209 B2 | 4/2022 | Wittmann et al. |
| 11,312,864 B2 | 4/2022 | Wittmann et al. |
| 2002/0156177 A1 | 10/2002 | Freund |
| 2005/0100502 A1 | 5/2005 | Krauss et al. |
| 2007/0100058 A1 | 5/2007 | Noguchi et al. |
| 2007/0151178 A1 | 7/2007 | Baikerikar et al. |
| 2007/0187033 A1 | 8/2007 | Shumacher et al. |
| 2007/0193669 A1 | 8/2007 | Giannini et al. |
| 2008/0066839 A1 | 3/2008 | Sandstrom et al. |
| 2009/0099281 A1 | 4/2009 | Sakurai et al. |
| 2010/0130639 A1 | 5/2010 | Viola et al. |
| 2010/0204368 A1 | 8/2010 | Benko et al. |
| 2010/0304141 A1 | 12/2010 | Kamegawa et al. |
| 2011/0236816 A1 | 9/2011 | Stanyschofsky et al. |
| 2012/0302664 A1 | 11/2012 | Kamada |
| 2013/0046064 A1 | 2/2013 | Herd et al. |
| 2013/0256113 A1 | 10/2013 | Tumiatti et al. |
| 2013/0312472 A1 | 11/2013 | Brehmer et al. |
| 2014/0039146 A1 | 2/2014 | Adam |
| 2014/0116594 A1 | 5/2014 | Miyazaki |
| 2014/0162873 A1 | 6/2014 | Gu |
| 2014/0227325 A1 | 8/2014 | Naskar et al. |
| 2014/0339467 A1 | 11/2014 | Elliot et al. |
| 2015/0152255 A1 | 6/2015 | Mlayah et al. |
| 2016/0102113 A1 | 4/2016 | Jansen et al. |
| 2016/0200754 A1 | 7/2016 | Wittmann et al. |
| 2016/0230099 A1 | 8/2016 | Hilli et al. |
| 2017/0226535 A1 | 8/2017 | Tudman |
| 2018/0179339 A1 | 6/2018 | Wikberg et al. |

FOREIGN PATENT DOCUMENTS

| | | |
|---|---|---|
| CA | 700368 A | 12/1964 |
| CA | 818607 A | 7/1969 |
| CA | 2920702 A1 | 2/2015 |
| CA | 3002724 A1 | 5/2017 |
| CN | 102212219 A | 10/2011 |
| CN | 103951858 A | 7/2014 |
| CN | 104245799 A | 12/2014 |
| CN | 106243427 A | 12/2016 |
| DE | 19828483 A1 | 1/1999 |
| DE | 102007056170 A1 | 11/2008 |
| DE | 2007022840 A1 | 12/2008 |
| DE | 2008050966 A1 | 5/2009 |
| DE | 2011113825 A1 | 3/2013 |
| DE | 102015015549.0 | 11/2015 |
| DE | 102014215807 B3 | 12/2015 |
| DE | 102014215627 A1 | 2/2016 |
| DE | 102016201801.9 | 2/2016 |
| EP | 1233042 A2 | 8/2002 |
| EP | 1457308 A1 | 9/2004 |
| EP | 2130893 A2 | 12/2009 |
| EP | 2223928 A1 | 9/2010 |
| EP | 2305750 A1 | 4/2011 |
| EP | 2479223 A1 | 7/2012 |
| EP | 2484434 A1 | 8/2012 |
| EP | 2671632 A2 | 12/2013 |
| EP | 2937388 A1 | 10/2015 |
| EP | 2796561 B1 | 7/2016 |
| EP | 3053929 A1 | 8/2016 |
| EP | 3059287 A1 | 8/2016 |
| EP | 2681296 B1 | 4/2018 |
| JP | 2005075856 A | 3/2005 |
| KR | 20140102807 A | 8/2014 |
| RU | 2417172 C2 | 4/2011 |
| RU | 2442806 C2 | 2/2012 |
| WO | 2005100502 A1 | 10/2005 |
| WO | 2008095589 A1 | 8/2008 |
| WO | 2009127727 A1 | 10/2009 |
| WO | 2009145784 A1 | 12/2009 |
| WO | 2010006881 A1 | 1/2010 |
| WO | 2010043562 A1 | 4/2010 |
| WO | 2010112230 A1 | 10/2010 |
| WO | 2011001315 A1 | 1/2011 |
| WO | 2011006552 A | 1/2011 |
| WO | 2011013161 A1 | 2/2011 |
| WO | 2012000033 A1 | 1/2012 |
| WO | 2012168502 A1 | 12/2012 |
| WO | 2013144454 A1 | 10/2013 |
| WO | 2014016344 A1 | 1/2014 |
| WO | 2014096544 A1 | 6/2014 |
| WO | 2014122163 A1 | 8/2014 |
| WO | 2014180753 A1 | 11/2014 |
| WO | 2015018944 A1 | 2/2015 |
| WO | 2015025076 A1 | 2/2015 |
| WO | 2015056757 A1 | 4/2015 |
| WO | 2015097196 A2 | 7/2015 |
| WO | 2016001490 A1 | 1/2016 |
| WO | 2016020383 A1 | 2/2016 |
| WO | 2016207493 A1 | 12/2016 |
| WO | 2017085278 A1 | 5/2017 |
| WO | 2017109672 A1 | 6/2017 |
| WO | 2019106080 A1 | 6/2019 |
| WO | 2020115143 A1 | 6/2020 |
| WO | 2021005230 A1 | 1/2021 |

OTHER PUBLICATIONS

LignoTech, "Borrosperse NA", Dec. 13, 2001. (Year: 2001).*
Translation of PCT International Search Report in PCT/EP2020/069628 dated Nov. 9, 2020, 2 pages.
Challenge Tech handmade tires catalogue (published 2015), 2 pages.
Continental Solid Tires catalogue (published 2018), 24 pages.
Michelin X Tweel Airless Radial Tire Family catalogue (published 2018), 8 pages.
Product information Ultrasil 360, Feb. 2018 (Evonik), 2 pages.
"ATSM International "Standard Test Method for Carbon Black—Total and External Surface Area by Nitrogen Adsorption"", Designation: D6556-09, Dec. 15, 2019.
"Dynamic Mechanical Properties of Passenger and Light Truck Tire Treads", NHTSA, Feb. 2010, 28 pages.
"How much does a tyre weigh?", (1 Aug. 8, 2015; Author: OPONEO. CO.UK, Adam Winter; http://www.oponeo.co. uk:80/tyre-article/how-muchdoes-a-tyre-weigh—capture from web.archive.org dated May 5, 2016).
"Hydroisotop GmbH, "Nachwachsende Rohstoffe, Sekundarbrennstoffe, Apr. 13, 2018".
"Hydrothermal Carbonization—1. Influence of Lignin in Lignocelluloses", Dec. 2011, Chemical Engineering & Technology 34(12) (DOI:10.1002/ceat.201100487).
"IPC vol. 1 Sec B, 8th. ed.", article WIPO, International Patent Classification (core level), 2006 particular relevance: pp. 106-108.
"Lignin Filler for Tires (1957), 5 pages".
"Popular mechanics", 1914, vol. 22, No. 3, p. 402.
"Product information Ultrasil VN 3, Sep. 2018 (Evonik), 2 pages".
"The Pneumatic Tire", Feb. 2006, available from www.nhtsa.gov, 33 pages.
Brebu, Mihai, et al., "Thermal Degradation of Lignin—A Review", 2010, Cellulose Chern. Technol., 44(9), 353-363.
Brock, F., et al., "Current Pretreatment Methods for AMS Radiocarbon Dating at the Oxford Radiocarbon Accelerator Unit (ORAU)", Radiocarbon, vol. 52, No. 1, pp. 103-112 (2010).
Chen, Xue, et al., "Effect of hydrothermal pretreatment on the structural changes of alkaline ethanol lignin from wheat straw", 2016, Scientific Reports 6:39354, DOI:1 0.1 038/srep39354, 1-9.
Chen, Xue, et al., "Effect of hydrothermal pretreatment on the structural changes of alkaline ethanol lignin from wheat straw", Scientific Reports, published Dec. 16, 2016, pp. 1-9, Springer Nature.
Clark, Samuel K., "Mechanics of Pneumatic Tires", 1971, National Bureau of Standards Monograph 122, p. 360.
Czernik, J., et al., "Preparation of Graphite Targets in the Gliwice Radiocarbon Laboratory for AMS 14C Dating", Radiocarbon, vol. 43, No. 2A, pp. 283-291 (2001).
Forrest, M.J., "Rapra Review Reports, Report 139, Rubber Analysis—Polymers, Compounds and Products", 158 pages, vol. 12 issue No. 7, 2001.

(56) References Cited

OTHER PUBLICATIONS

Guy, L., et al., "New Insights in the Dynamic Properties of Precipitated Silica Filled Rubber Using a New High Surface Silica", Raw Materials and Applications, 2009 particular relevance: pp. 383-384.
Hofmann, W., "Rubber Technology Handbook", Dusseldorf, Spring, p. 3 (1980).
Jiang, Guozhan, et al., "Effect of the temperature of the composition of lignin pyrolysis products", Energy Fuels, 2010, 24, 4470-4475.
Kaewsakul, W., et al., "Optimization of Rubber Formulation for Silicareinforced Natural Rubber Compounds", Rubber Chemistry and Technology, vol. 86, No. 2, 2013, 17 pages.
Kang, Shimin, et al., "Characterization of Hydrochars Produced by Hydrothermal Carbonization of Lignin, Cellulose, d-Xylose, and Wood Meal", Ind. Eng. Chem. Res. 2012, 51, 26, 9023-9031.
Konecny, P., et al., "Dynamic mechanical properties of filled styrene butadiene rubber compounds: comparison of tensile and shear data", Polym. Adv. Technol, 2007: 18:122-127.
Kostial, P., et al., "The Chosen Aspects of Materials and Construction Influence on the Tire Safety in: Composites and Their Properties", Aug. 22, 2012 (DOI: 10.5772/48181), 34 pages.
Leister, G., "Fahrzeugrader-Fahrzeugreifen", 2nd Ed., 2015, 175 pages.
Limper, Andreas, "Mixing of Rubber Compounds", Carl Hanser Verlag, 201 1 particular relevance: pp. 71-72.
Popa, V. I., et al., "Nanoparticles based on modified lignins with biocide properties", Cellulose Chemistry and Technology, vol. 45, Issue 3-4, pp. 221-226 (2011).
Ramsey, C.B., "Bayesian Analysis of Radiocarbon Dates", Radiocarbon, vol. 51, No. 1,pp. 337-360 (2009).
Ramsey, C.B., "Development of the Radiocarbon Calibration Program", Radiocarbon, vol. 43, No. 2A, pp. 355-363 (2003).
Ramsey, C.B., et al., "Recent and Planned Developments of the Program OxCal", Radiocarbon, vol. 55, Issue 2, pp.720-730 (2013).
Reimer, P.J., et al., "Intcal 13 and Marine13 Radiocarbon Age Calibration Curves 0-50,000 Years CAL BP", Radiocarbon, vol. 55, No. 4, pp. 1869-1887 (2013).
Roethemeyer, F., et al., "Rubber technology. Materials—Processing—Products", 3rd ed. Carl Hanser Verlag, pp. 1 (2013) (Abstract Only).
Ross, Kelly, et al., "Comparative analysis of pyrolysis products from a variety of herbaceous, Canadian crop residues", Wood Journal of Agricultural Sciences, 2011, 7(6), 763-776.
Sazanov, Yu. N., et al., "Thermochemistry of Lignin", Russian J. of Appl. Chemistry, 2010, vol. 83, No. 2, 175-194.
Stuiver, M., et al., "Discussion. Reporting of 14 C Data", Radiocarbon, vol. 19, No. 3, pp. 355-363 (1977).
Teh, Swe Jyan, et al., "ZnCl2/NaCl-Catalysed Hydrothermal Carbonization of Glucose and Oil Palm Shell Fiber", Nanoscience and Nanotechnology Letters vol. 7, 611-615, 2015.
Wikberg, Hanne, et al., "Structural and morphological changes in Kraft lignin during hydrothermal carbonization", 2015, ACS Sustainable Chern. Eng.,3, 2737-2745.
Zhang, Bo, et al., "Reaction Kinetics of the Hydrothermal Treatment of Lignin", Appl. Biochem. Biotechnol., Mar. 2008, v. 147, pp. 119-131.
Zhao, J., et al., "Thermal degradation of softwood lignin and hardwood lignin by TGFTIR and Py-GC/MS", Polymer Degradation and Stability, 2014, 108, 133-138.
"Phenoplast", https://de.wikipedia.org/w/index.php?title=Phenoplast&oldid=18331900: with English machine translation of "Phenoplaste" section. (7 pages).
Over, Lena Charlotte, "Sustainable Derivatization of Lignin and Subsequent Synthesis of Cross-Linked Polymers", Karlsruher Institut für Technologie (KIT) 2017 (218 pages), Jul. 26, 2017.

\* cited by examiner

METHOD FOR PRODUCING STABILIZED LIGNIN

PRIOR ART

Lignin from hardwood, softwood, and annual plants exhibits high solubility in many polar and alkaline media after extraction/recovery in the form of, for example, kraft lignin, lignosulfonate or hydrolysis lignin. Lignins exhibit inter alia a glass transition at temperatures of mostly 80° C. to 150° C. Softening changes the microscopic structure of lignin particles even at low temperatures. Lignin-containing materials consequently do not generally withstand high temperatures or change their properties. Moreover, the solubility of lignin in polar solvents such as dioxane and acetone containing e.g. 10% water or in alkaline solvents is usually >95% (Sameni et al., BioResources, 2017, 12, 1548-1565; Podschun et al., European Polymer Journal, 2015, 67, 1-11). These and other properties mean that lignin can be used only to a limited extent in material uses (DE102013002574A1).

Lignin is hereinbelow to be understood as meaning the sum of Klason lignin and acid-soluble lignin. The dry matter additionally contains other organic and inorganic constituents.

To overcome these disadvantages, the production by hydrothermal carbonization of a stabilized lignin characterized by a softening temperature (glass transition temperature) of more than 200° C. has been proposed (WO2015018944A1). By adjusting the pH, it is possible to obtain a stabilized lignin having a defined particle size distribution (WO2015018944A1).

Improved processes use lignin as a raw material for the production of particulate carbon materials that can be used for example as functional fillers in elastomers (WO2017085278A1). A key quality parameter for functional fillers is the external surface area of the particulate carbon material, which is determined through measurement of the STSA. Such processes make use of hydrothermal carbonization of a lignin-containing liquid, usually at temperatures between 150° C. and 250° C. Because of the high reactivity of the lignin at such temperatures, to achieve high specific surface areas it is necessary to strike a fine balance between pH, ionic strength, and lignin content of the lignin-containing liquid and also the temperature and duration of the hydrothermal carbonization. This is achieved by adjusting the pH to within the alkaline range, usually to values above 7.

For such particulate carbon materials, this opens the door to uses in materials different to those of the respective starting lignins. For example, the low solubility of less than 40% and a specific surface area of more than 5 m$^2$/g and less than 200 m$^2$/g allows them to be used in elastomers as reinforcing fillers and as a partial or complete substitute for carbon black.

The disadvantage of these processes is the low yield, which is generally between 40% and 60%. A further disadvantage of these processes is the high cost of tailoring the properties of the lignin-containing liquid (pH, ionic strength, lignin content) to the process parameters of the hydrothermal carbonization (temperature and residence time) in order to achieve increasingly higher specific surface areas. While it is easy to achieve surface areas within the range from 5 m$^2$/g to 40 m$^2$/g, the necessary sensitivity of the abovementioned balance means it is easier to achieve specific surface areas above 40 m$^2$/g in the laboratory than on an industrial scale. Such an adjustment aimed at increasing the specific surface area can be assumed to lead to a reduction in yield.

A known process for increasing the yield of solid material and boosting lignin conversion for the production of fuels from a suspension of dried black liquor and water by hydrothermal carbonization at temperatures between 220° C. and 280° C. is the addition of formaldehyde [Bioressource Technologie 2012, 110 715-718, Kang et al.]. Kang et al. suggest adding 37 g of formaldehyde per 100 g of dry lignin at a solids concentration of 20% (100 ml of a 2.8% formaldehyde solution per 25 g dry matter obtained by drying black liquor having a lignin content of 30% based on dry matter). This is able to increase the conversion into solids of the lignin present in the black liquor from 60-80% to values between 90% and 100%, the highest values being achieved at temperatures between 220° C. and 250° C. This prior art attributes the increase in yield to the polymerization between formaldehyde, the solid in the black liquor, and the carbonization products formed from this solid (page 716, final paragraph).

Disadvantage of this Prior Art
  the high specific dosing of formaldehyde of 37 g per 100 g of lignin,
  the high ash content of the dry matter used and of the products produced therefrom,
  the polymerization between formaldehyde, the solid in the black liquor, and the carbonization products formed from this solid, and
  the associated restriction of the use of the product to uses in fuels.

DESCRIPTION

The aim of the present invention is to find a process that results in high yields of a stabilized lignin that is suitable for material uses.

The object of the invention is to specify a process that
  reduces the solubility of the lignin in alkaline and/or polar media,
  increases or eliminates the glass transition temperature of the lignin,
  results in a stabilized lignin having advantageous particle properties, and
  has a high yield.

In a first variant, a process for producing an undissolved stabilized lignin having an STSA surface area of at least 10 m$^2$/g from lignin-containing raw materials is accordingly provided, wherein
  in a first process step, a lignin dissolved in a liquid and a crosslinker are reacted, thereby producing a dissolved modified lignin, and
  in a second process step, the dissolved modified lignin is converted into an undissolved stabilized lignin.

Preferred lignin-containing raw materials are in particular:
  black liquor from the kraft digestion of woody biomass or solids produced therefrom (e.g. LignoBoost lignin, LignoForce lignin),
  solids from the enzymatic hydrolysis of woody biomass,
  black liquor from the digestion of woody biomass with sulfites (lignosulfonates) or solids produced therefrom or liquids from the digestion of woody biomass with solvents or solids produced therefrom (e.g. Organosolv lignin).

If the lignin-containing raw materials are solids, the lignin contained therein must be completely or partially dissolved in a liquid before the first process step. Processes for dissolving lignin in liquids are prior art.

In addition to the dissolved lignin that is reacted with the crosslinker in the first process step, undissolved lignin may also be present in the liquid in dispersed form. For the present process it is thus not necessary for all the lignin to be present dissolved in the liquid. It is however advantageous for more than 50%, particularly preferably more than 60%, even more preferably more than 70%, particularly preferably more than 80%, in particular more than 90%, of the lignin to be dissolved in the liquid.

A dissolved modified lignin is in particular understood as meaning that
- the aromatics in the lignin are still mainly connected via ether linkages,
- the proportion of para-substituted phenolic rings in the total proportion of aromatic rings is greater than 95%, preferably greater than 97%, particularly preferably greater than 99%, and the content of free phenol is below 200 ppm, preferably below 100 ppm, even more preferably below 75 ppm, particularly preferably below 50 ppm,
- the content of Klason lignin is at least 70%, preferably at least 75%, more preferably at least 80%, in particular at least 85%.

The phenol content is determined in accordance with DIN ISO 8974. The Klason lignin content is determined as acid-insoluble lignin in accordance with TAPPI T 222.

The term "undissolved stabilized lignin" is for the purposes of the present invention to be understood as meaning the solid that can be separated from the liquid following the second process step. The undissolved stabilized lignin is only sparingly soluble in alkaline liquids and has low porosity. The properties of the stabilized lignin obtained by the present process are described in detail hereinbelow.

In this first variant, an improved process for producing an undissolved stabilized lignin from lignin-containing raw materials is advantageously provided, wherein
- in a first process step, a lignin dissolved in a liquid, the lignin containing phenolic aromatics, aromatic and aliphatic hydroxy groups and/or carboxy groups as crosslinkable units, and a crosslinker, the crosslinker containing at least one functional group as a crosslinkable unit that can react with the crosslinkable units in the lignin, are reacted at a first temperature T1 that is between a first maximum temperature T1max and a first minimum temperature T1min for a defined period of time, thereby producing a dissolved modified lignin, and
- in a second process step, the dissolved modified lignin is converted into an undissolved stabilized lignin at a second temperature T2 that is between a second maximum temperature T2max and a second minimum temperature T2min for a defined period of time.

The present process increases the yield of undissolved stabilized lignin significantly compared to a process regime without the reaction with a crosslinker in a first process step.

The two-step process regime can have an advantageous effect on the conditions under which the respective process step is carried out.

Through the reaction of the crosslinker with the lignin dissolved in the liquid in the first process step, it is possible to ensure high selectivity in the reaction and to selectively obtain a dissolved modified lignin that is then converted into an undissolved stabilized lignin in the second process step. By executing the first process step in the solution, the polymerization of the crosslinker with the lignin and with any carbonization products formed from the lignin is reduced or completely suppressed. Converting the modified dissolved lignin into a stabilized, undissolved lignin in the second process step allows the particle properties of the stabilized undissolved lignin to be influenced selectively. This allows advantageous particle properties to be set.

The two-step process regime of the present process surprisingly affords a stabilized lignin in which the yield and specific surface area are significantly higher than that of a stabilized lignin produced from the same starting material according to the prior art without the reaction with a crosslinker in the first process step.

Moreover, the two-step process regime of the present process surprisingly affords a stabilized lignin in which the yield and specific surface area are significantly higher than that of a stabilized lignin produced from the same starting material according to the prior art with the reaction with a crosslinker, but in a one-step process.

The yield of undissolved stabilized lignin based on the dissolved lignin is preferably more than 60%, preferably more than 70%, more preferably more than 80%, in particular more than 85%.

In one embodiment of the above process variant, the crosslinking compound is added in the first process step.

The dosing of the crosslinker is preferably performed such that the amount corresponds to a maximum of 4 mol, preferably a maximum of 3 mol, more preferably a maximum of 2.5 mol, particularly preferably a maximum of 2 mol, even more preferably a maximum of 1.75 mol, in particular a maximum of 1.5 mol, of crosslinkable units in the crosslinker per mole of therewith crosslinkable units in the lignin used.

The dosing of the crosslinker is preferably performed such that the amount corresponds to at least 0.5 mol, preferably at least 0.75 mol, more preferably at least 1 mol, particularly preferably at least 1.1 mol, in particular at least 1.15 mol, of crosslinkable units in the crosslinker per mole of therewith crosslinkable units in the lignin used.

In a second variant, a process for producing a stabilized lignin from lignin-containing raw materials is provided, wherein
- in a first process step, a lignin dissolved in a liquid, the lignin containing phenolic aromatics, aromatic and aliphatic hydroxy groups and/or carboxy groups as crosslinkable units, and a crosslinker, the crosslinker containing at least one functional group as a crosslinkable unit that can react with the crosslinkable units in the lignin, and the amount of crosslinking compound being chosen such that the content of crosslinkable units in the crosslinker is between 0.5 and 4 mol per mol of crosslinkable units in the lignin, are reacted, thereby producing a dissolved modified lignin, and
- in a second process step, the dissolved modified lignin is converted into an undissolved stabilized lignin at a second temperature T2 that is between a second maximum temperature T2max and a second minimum temperature T2min for a defined period of time.

An alternative process is accordingly likewise provided in which an optimal amount of crosslinker based on the amount of lignin used is chosen, but a defined temperature regime is not necessary in the first process step. This followed on from the surprising finding that the yield and specific surface area of the stabilized carbonized lignin obtained can be significantly increased when an optimal amount of crosslinker is chosen.

In one embodiment of the second process variant, the first process step can be supplemented by analogy with the first process variant. In one such combination of the first with the second process variant, an advantageous process for producing a stabilized lignin from lignin-containing raw materials is provided, wherein in a first process step, a lignin dissolved in a liquid, the lignin containing phenolic aromatics, aromatic and aliphatic hydroxy groups and/or carboxy groups as crosslinkable units, and a crosslinker, the crosslinker containing at least one functional group as a crosslinkable unit that can react with the crosslinkable units in the lignin, and the amount of crosslinking compound being chosen such that the content of crosslinkable units in the crosslinker is between 0.5 and 4 mol per mol of crosslinkable units in the lignin, are reacted at a first temperature T1 that is between a first maximum temperature T1max and a first minimum temperature T1min for a defined period of time, thereby producing a dissolved modified lignin, and in a second process step, the dissolved modified lignin is converted into an undissolved stabilized lignin at a second temperature T2 that is between a second maximum temperature T2max and a second minimum temperature T2min for a defined period of time.

Crosslinkers can react with free ortho and para positions on phenolic rings (phenolic guaiacyl groups and p-hydroxyphenyl groups) in the lignin. Examples of suitable crosslinkers for reacting at free ortho and para positions on phenolic rings are aldehydes such as formaldehyde, furfural, 5-HMF, hydroxybenzaldehyde, vanillin, syringaldehyde, piperonal, glyoxal, glutaraldehyde or sugar aldehydes. Preferred crosslinkers for reaction at phenolic rings are formaldehyde, furfural, and sugar aldehydes (ethanals/propanals) such as glyceraldehyde and glycolaldehyde.

In addition, crosslinkers can react with aromatic and aliphatic OH groups (phenolic guaiacyl groups, p-hydroxyphenyl groups, syringyl groups) in the lignin. Preference may be for example given to using for this purpose bifunctional and also multifunctional compounds containing epoxy groups, such as glycidyl ethers, isocyanate groups, such as diisocyanates or oligomeric diisocyanates, or acid anhydrides. Preferred crosslinkers for reaction at aromatic and aliphatic OH groups are isocyanates and acid anhydrides.

Crosslinkers can also react with carboxyl groups. For example, diols and triols can be used for this purpose. Preferred crosslinkers for reacting with carboxyl groups are diols.

In addition, crosslinkers can react with phenolic rings, aromatic and aliphatic OH groups, and carboxyl groups. Preference may be for example given to using for this purpose bifunctional and also multifunctional compounds containing at least two of the abovementioned crosslinker functional groups.

When crosslinkers that react with the phenolic ring are used, the crosslinkable units in the employed lignin are understood as meaning phenolic guaiacyl groups and p-hydroxyphenyl groups. The concentration of crosslinkable units (mmol/g) is determined for example via $^{31}$P-NMR spectroscopy (Podschun et al., European Polymer Journal, 2015, 67, 1-11), guaiacyl groups containing one crosslinkable unit and p-hydroxyphenyl groups two crosslinkable units.

When crosslinkers that react with aromatic and aliphatic OH groups are used, the crosslinkable units in the employed lignin are understood as meaning all aromatic and aliphatic OH groups. The concentration of crosslinkable units (mmol/g) is determined for example via $^{31}$P-NMR spectroscopy, all groups containing one crosslinkable unit.

When crosslinkers that react with carboxyl groups are used, the crosslinkable units in the employed lignin are understood as meaning all carboxyl groups. The concentration of crosslinkable units (mmol/g) is determined for example via $^{31}$P-NMR spectroscopy, all groups containing one crosslinkable unit.

When using bifunctional crosslinkers, two moles of crosslinkable units are available per mole of bifunctional crosslinker. Accordingly, when using trifunctional crosslinkers, three moles of crosslinkable units are available per mole of trifunctional crosslinker, and so forth.

The amount of crosslinker is preferably a maximum of 35 g/100 g lignin, preferably a maximum of 30 g/100 g lignin, more preferably a maximum of 25 g/100 g lignin.

The amount of formaldehyde is preferably a maximum of 25 g/100 g lignin, preferably a maximum of 20 g/100 g lignin, more preferably a maximum of 15 g/100 g lignin, in particular a maximum of 12 g/100 g lignin. The amount of formaldehyde added can thus be within a range between 1-20 g/100 g lignin, preferably between 5-15 g/100 g lignin, more preferably between 6-10 g/100 g lignin.

The temperature in the first process step is advantageously more than 50° C., preferably more than 60° C., particularly preferably more than 70° C. and less than 180° C., preferably less than 150° C., further preferably less than 130° C., particularly preferably less than 100° C.

The average residence time in the first process step is advantageously at least 5 minutes, more preferably at least 10 minutes, more preferably at least 15 minutes, particularly preferably at least 30 minutes, in particular at least 45 minutes, but less than 300 minutes.

An advantageous combination of time and temperature window for the first process step is a minimum temperature of 50° C. and a maximum temperature of 180° C. alongside a residence time of at least 15 minutes, preferably at least 20 minutes, more preferably at least 30 minutes, particularly preferably at least 45 minutes. An alternatively advantageous combination of time and temperature window for the first process step is a minimum temperature of 50° C. and a maximum temperature of 130° C. alongside a residence time of at least 10 minutes, preferably at least 15 minutes, more preferably at least 20 minutes, particularly preferably at least 30 minutes, in particular at least 45 minutes.

In a particularly preferred embodiment, the mixture of dissolved lignin and the at least one crosslinking compound is in the first process step held at a temperature T1 between 50° C. and 180° C. for a residence time of at least 20 min, preferably at least 60 min.

In a further particularly preferred embodiment, the mixture of dissolved lignin and the at least one crosslinking compound is in the first process step held at a temperature T1 between 70° C. and 130° C. for a residence time of at least 10 min, preferably at least 50 min.

During the first process step, the liquid containing the dissolved lignin and the crosslinker can advantageously be heated. The heating rate is preferably less than 15 kelvins per minute, more preferably less than 10 kelvins per minute, particularly preferably less than 5 kelvins per minute.

The temperature in the first process step is advantageously kept largely constant for a period of at least 5 minutes, preferably at least 10 minutes, more preferably at least 15 minutes, particularly preferably at least 30 minutes.

A combination of heating and maintaining a constant temperature in the first process step is also advantageous.

The pressure is preferably at least 0.2 bar, and preferably a maximum of 20 bar, above the saturated steam pressure of the liquid containing the lignin.

The pH of the liquid containing the dissolved lignin is before the first process step advantageously above the pH of the liquid containing the modified dissolved lignin after the first process step.

The pH of the liquid containing the dissolved lignin before the first process step is advantageously more than 7, preferably more than 7.5, further preferably more than 8, particularly preferably more than 8.5, but less than 12.5.

The pH of the liquid containing the dissolved modified lignin after the first process step is advantageously more than 6.5, preferably more than 7, preferably more than 8, but less than 12.

The pH of the liquid containing the dissolved modified lignin is after the first process step preferably at least 0.2, preferably at least 0.5 units, more preferably at least 1 unit, below the pH of the liquid containing the dissolved lignin before the first process step.

The proportion of lignin based on the total mass of the liquid containing the dissolved lignin is in the first process step advantageously between 3% and 25%, preferably less than 20%, more preferably less than 18%.

The temperature in the second process step is advantageously less than 270° C., preferably less than 260° C., further preferably less than 250° C., even more preferably less than 240° C., additionally preferably less than 230° C., additionally particularly preferably less than 220° C., in particular less than 215° C.

In an advantageous embodiment, the temperature in the second process step is at least 150° C., preferably at least 160° C., more preferably at least 170° C.

The temperature in the second process step can therefore vary within a wide range between 150° C. and 250° C.

In a particularly preferred embodiment, the second reaction step corresponds to a hydrothermal treatment, wherein the temperature T2 in the hydrothermal treatment is between 150° C. and 250° C., preferably between 170° C. and 240° C., more preferably between 175° C. and 235° C.

The pressure is preferably at least 0.2 bar, and preferably a maximum of 20 bar, above the saturated steam pressure of the liquid containing the lignin.

The average residence time in the second process step is advantageously at least 10 minutes, more preferably at least 30 minutes, particularly preferably at least 45 minutes, but less than 600 minutes, preferably less than 480 minutes, particularly preferably less than 450 minutes.

The pH of the liquid containing the modified dissolved lignin is before the second process step advantageously above the pH of the liquid containing the undissolved stabilized lignin after the second process step. The pH of the liquid containing the undissolved stabilized lignin after the second process step is advantageously more than 5, preferably more than 6, but less than 11. The pH of the liquid containing the undissolved stabilized lignin is after the second process step preferably at least 0.2, preferably at least 0.5 units, more preferably at least 1 unit, below the pH of the liquid containing the dissolved modified lignin before the second process step.

The proportion of lignin based on the total mass of the liquid containing the modified dissolved lignin is in the second process step advantageously between 3% and 25%, preferably less than 20%, more preferably less than 18%.

The crosslinker is during the first process step advantageously generated in situ. The advantage of generating a crosslinker in the first process step is that the amount of crosslinker added in the first process step can be reduced or omitted altogether.

The crosslinker is during the first process step advantageously generated in situ from carbohydrates (preferably cellulose, hemicelluloses or glucose) dispersed or dissolved in the liquid containing the dissolved lignin. Carbohydrates, preferably cellulose, hemicelluloses or glucose, may preferably be added to the liquid containing the dissolved lignin, or are already present. In an example of such an advantageous process regime,
in a first process step
a carbohydrate-based crosslinker, preferably aldehydes, preferably glyceraldehyde or glycolaldehyde, is obtained from carbohydrates dissolved or dispersed in the liquid containing the dissolved lignin,
the lignin dissolved in the liquid and the carbohydrate-based crosslinker are reacted, thereby producing a dissolved modified lignin, and
in a second process step, the dissolved modified lignin is converted into an undissolved stabilized lignin.

The crosslinker is during the first process step advantageously generated in situ from the lignin dispersed or dissolved in the liquid containing the dissolved lignin. In an example of such an advantageous process regime,
in a first process step
a lignin-based crosslinker, preferably aldehydes, preferably methanediol or glycolaldehyde, is obtained from carbohydrates dissolved or dispersed in the liquid containing the dissolved lignin,
the remaining lignin dissolved in the liquid and the lignin-based crosslinker are reacted, thereby producing a dissolved modified lignin, and
in a second process step, the dissolved modified lignin is converted into an undissolved stabilized lignin.

The undissolved stabilized lignin preferably has advantageous particle properties that enable it to be used in material uses. The undissolved stabilized lignin preferably has a D50 in the particle size distribution of less than 500 μm, preferably less than 300 μm, more preferably of less than 200 μm, in particular less than 100 μm, particularly preferably less than 50 μm. The undissolved stabilized lignin preferably has a D50 in the particle size distribution of more than 0.5 μm, preferably of more than 1 μm, more preferably of more than 2 μm.

The measurement of the particle size distribution of the stabilized lignin is carried out in a suspension with distilled water by laser diffraction in accordance with ISO 13320. Before and/or during measurement of the particle size distribution, the sample to be measured is dispersed ultrasonically until a particle size distribution stable over a number of measurements is obtained.

The undissolved stabilized lignin preferably has an STSA of at least 10 m$^2$/g, more preferably at least 20 m$^2$/g. The STSA is preferably less than 200 m$^2$/g. STSA (statistical thickness surface area) is here an indication of the external surface area of the stabilized lignin particles.

In one variant of the present stabilized lignin or particulate carbon material, the STSA surface area has values between 10 m$^2$/g and 180 m$^2$/g, preferably between 20 m$^2$/g and 180 m$^2$/g, more preferably between 35 m$^2$/g and 180 m$^2$/g, particularly preferably between 40 m$^2$/g and 180 m$^2$/g.

The BET surface area of the present stabilized lignin advantageously deviates from the STSA surface area only by a maximum of 20%, preferably by a maximum of 15%, more preferably by a maximum of 10%. The BET surface area is determined as the total surface area of the external and internal surface via the nitrogen surface area according to Brunauer, Emmett, and Teller.

The undissolved stabilized lignin is at the end of the second process step preferably present dispersed in water.

The undissolved stabilized lignin preferably has low porosity. The pore volume of the stabilized lignin is advantageously <0.1 cm$^3$/g, more preferably <0.01 cm$^3$/g, particularly preferably <0.005 cm$^3$/g. This is a distinguishing feature of the present stabilized lignin compared to finely divided porous materials such as ground biogenic powdered activated carbon, which in addition to a BET surface area of usually more than 500 m$^2$/g can also have an STSA surface area of at most 10 m$^2$/g.

A distinguishing feature of the undissolved stabilized lignin is the preferred advantageous particle properties, for example the D50 in the particle size distribution of less than 500 μm or the STSA of more than 10 m$^2$/g, preferably more than 20 m$^2$/g, of lignin-based resins produced through reaction with formaldehyde and converted from the solution via the gel state into a thermoset.

The BET surface area and STSA surface area are determined in accordance with the ASTM D 6556-14 standard. In a departure therefrom, the sample preparation/degassing for the STSA and BET measurement is in the present invention carried out at 150° C.

An undissolved stabilized lignin is understood as meaning the solid that can be separated from the liquid after the second process step by means of a solid-liquid separation. An example of such a solid-liquid separation is a centrifugation or a filtration.

The undissolved stabilized lignin preferably has only limited solubility in alkaline liquids. The solubility of the undissolved stabilized lignin is preferably less than 30%, preferably less than 25%, more preferably less than 20%.

The alkaline solubility of the undissolved stabilized lignin is determined as follows:

1. The undissolved stabilized lignin is separated from the liquid by centrifugation and washed twice with distilled water. The supernatant is each time decanted off.
2. The product from 1 is dried at 105° C. for 24 hours.
3. A suspension of the product from 2 having a concentration of 6.6% by mass and 0.1 M NaOH, and thus an alkaline suspension, is produced. If the pH is below 10 after addition of the sodium hydroxide solution, additional sodium hydroxide solution is metered in.
4. The alkaline suspension is stirred at 25° C. for 2 hours.
5. The alkaline suspension is then centrifuged at 6000 g.
6. The supernatant from the centrifugation is filtered through a porosity 4 frit.
7. The solid after centrifugation is washed twice with distilled water by repeating 4. to 6.
8. The solid after centrifugation and the residues on the porosity 4 frit are dried at 105° C. and measured.
9. The alkaline solubility of the lignin-rich solid is calculated as follows:
   Alkaline solubility of lignin-rich solid [%]=mass of the undissolved fraction from centrifugation, filtration and drying [g]/mass of the product obtained in step 2 [g]*100

The undissolved stabilized lignin preferably has a glass transition temperature of more than 160° C., further preferably of more than 180° C., particularly preferably of more than 200° C., in particular of more than 250° C. The undissolved stabilized lignin preferably does not have a measurable glass transition temperature.

After solid-liquid separation, washing, and drying, the measurement of the glass transition temperature is performed on the dry undissolved stabilized lignin in accordance with DIN 53765.

An undissolved stabilized lignin is in accordance with the invention also one having:
- an STSA of at least 10 m$^2$/g, more preferably at least 20 m$^2$/g. The STSA is preferably less than 200 m$^2$/g;
- a signal in the solid-state $^{13}$C-NMR at 0 to 50 ppm, preferably at 10 to 40 ppm, more preferably at 25 to 35 ppm, having an intensity relative to the signal of the methoxy groups at 54 to 58 ppm of 1-80%, preferably 5-60%, particularly preferably 5-50%, and a $^{13}$C-NMR signal at 125 to 135 ppm, preferably at 127 to 133 ppm, that is higher than that of the lignin used;
- a $^{14}$C content that corresponds to that of renewable raw materials, preferably greater than 0.20 Bq/g carbon, particularly preferably greater than 0.23 Bq/g carbon, but preferably in all cases less than 0.45 Bq/g carbon;
- a carbon content based on the ash-free dry substance of between 60% by mass and 80% by mass, preferably between 65% by mass and 75% by mass;
- a glass transition temperature of more than 160° C., further preferably of more than 180° C., particularly preferably of more than 200° C., in particular of more than 250° C. The undissolved stabilized lignin preferably does not have a measurable glass transition temperature;
- a pore volume in the stabilized lignin of less than 0.1 cm$^3$/g, more preferably less than 0.01 cm$^3$/g, particularly preferably less than 0.005 cm$^3$/g.

The present invention is elucidated in more detail hereinbelow on the basis of exemplary embodiments with reference to the figures. In the figures.

EXEMPLARY EMBODIMENTS

In the examples that follow, the BET is stated instead of the STSA. For the undissolved stabilized lignins produced here, BET and STSA do not however differ by more than 10% from one another.

Example 1

The raw material for this example is the solid from an enzymatic hydrolysis of woody biomass (hardwood). The solid was converted into a liquid containing dissolved lignin through addition of water and sodium hydroxide solution.

Figure 1:
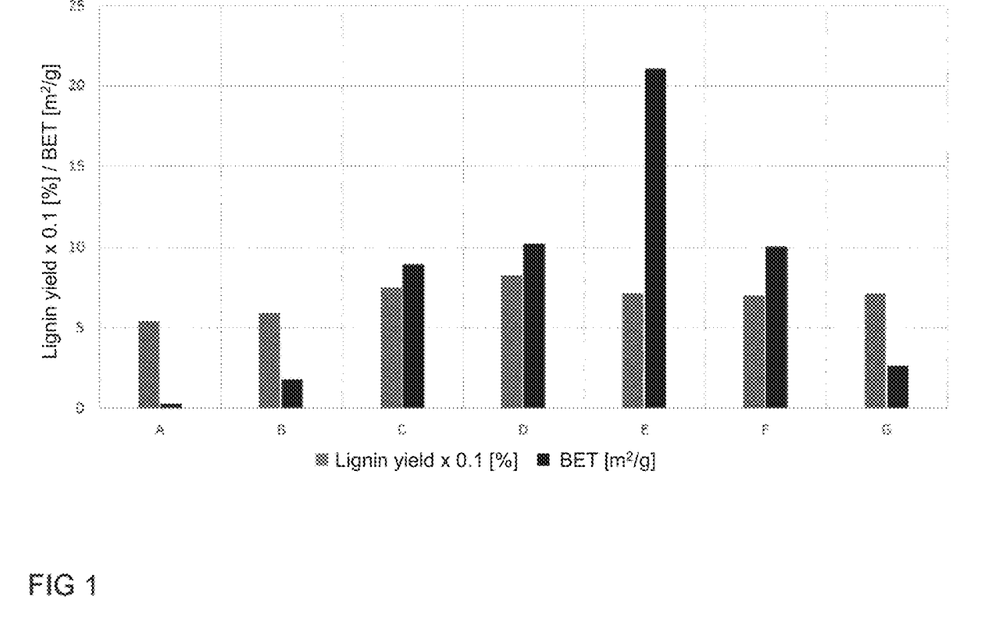
FIG. 1 shows a schematic representation of the results for a first embodiment according to exemplary embodiment 1.

To each 30 g of the liquid containing dissolved lignin and having a dry matter content of 15% and a pH of 10.9 was added, in the first process step of reactions with the crosslinker formaldehyde, an amount of 23.5% formaldehyde solution as defined in Table 1. The liquid containing the dissolved lignin and the formaldehyde solution were homogenized and in the first process step treated for the times and temperatures stated in Table 1, producing a modified dissolved lignin, and then treated in the second process step, producing an undissolved stabilized lignin. The undissolved stabilized lignin was obtained by centrifugation. After washing twice with demineralized water and drying in an air-circulation drying oven, the yields given in Table 1 and FIG. 1 were obtained. The specific surface area (BET) in Table 1 and FIG. 1 was determined after heating at 150° C. under reduced pressure.

The dry matter used has a lignin content of 88%. The lignin fraction of the dry matter used has 1.3 mmol/g of phenolic guaiacyl groups and 0.1 mmol/g of p-hydroxyphenyl groups and thus 1.5 mmol/g of crosslinkable units.

The formaldehyde used has 66.6 mmol of crosslinkable units per g of dry formaldehyde.

TABLE 1

Variants of the experiments in example 1 with varying additive concentrations

| No. | Crosslinker/ crosslinkable units in lignin [mol/mol] | Crosslinkable units in crosslinker/ crosslinkable units in lignin [mol/mol] | Crosslinker/lignin [g/100 g lignin] | Temperature and time in first step | Temperature and time in second step | Yield [undissolved stabilized lignin/dissolved lignin in percent] | BET [m²/g] |
|---|---|---|---|---|---|---|---|
| A | 0 | 0 | 0 | 70-130° C., 12 min 50-180° C., 26 min | 190° C., 3 h | 54 | 0.2 |
| B | 0.25 | 0.5 | 1.2 | 70-130° C., 12 min 50-180° C., 26 min | 190° C., 3 h | 59 | 1.8 |
| C | 0.75 | 1.5 | 3.6 | 70-130° C., 12 min 50-180° C., 26 min | 190° C., 3 h | 74 | 8.9 |
| D | 1.25 | 2.5 | 6.1 | 70-130° C., 12 min 50-180° C., 26 min | 190° C., 3 h | 82 | 10.2 |
| E | 1.25 | 2.5 | 6.1 | 70-130° C., 71 min 50-180° C., 85 min | 190° C., 3 h | 71 | 21.0 |
| F | 1.25 | 2.5 | 6.1 | 70-130° C., 12 min 50-180° C., 26 min | 190° C., 4 h | 69 | 10.0 |
| G | 1.75 | 3.5 | 8.6 | 70-130° C., 12 min 50-180° C., 26 min | 190° C., 3 h | 71 | 2.6 |
| E2 | 1.25 | 2.5 | 6.1 | 70-130° C., 71 min 50-180° C., 85 min | 190° C., 3 h | 72 | 20.9 |

As can be seen from Table 1 above, the yield and BET of the lignin material produced depend on the amount of crosslinker used and on the use of an upstream, first reaction step.

Thus, examples D, E, and F show that the use of a first process step while leaving the amount of crosslinker unchanged results in an increase in the BET of the material obtained. When the first reaction step is carried out for a period of 71 min or 85 min, the BET value (example E) is doubled by comparison with a shortened first reaction step.

The BET also initially increases with increasing amount of crosslinker (examples B-F), but falls when the amount of crosslinker is increased further (example G).

A similar effect can be seen in exemplary embodiment 2 (see Table 2 below). Here, doubling the amount of crosslinker results in a reduction in BET and in the yield of the stabilized lignin (examples I and L).

Thus an optimum clearly arises for the amount of crosslinker used.

Figure 2:
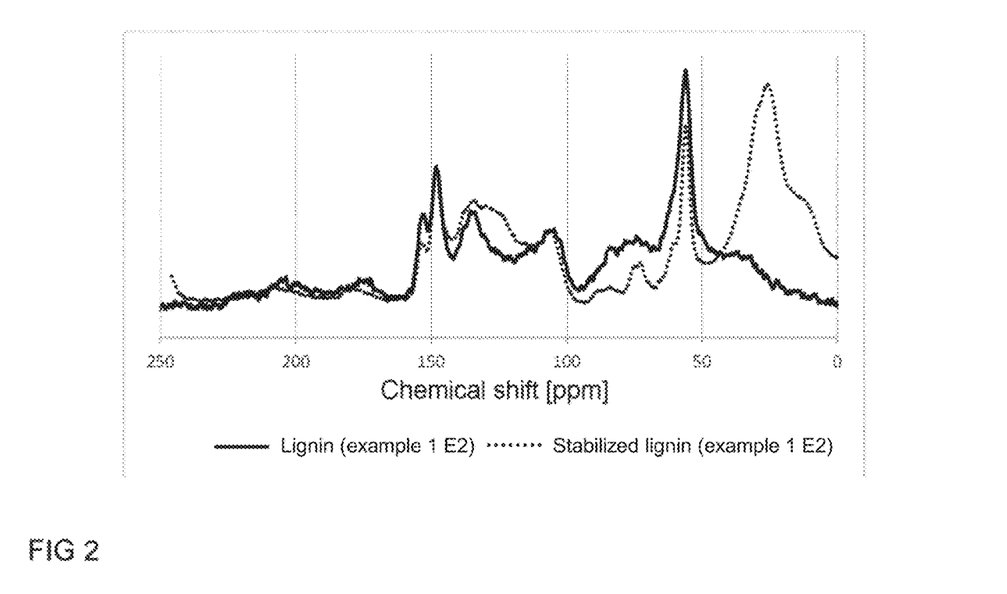
FIG. 2 shows a $^{13}$C-NMR spectrum of a stabilized lignin obtained according to exemplary embodiment 1.

In example E2, $^{13}$C-formaldehyde was used and analyzed by solid-state NMR spectroscopy. The spectra of the lignin used and stabilized lignin are presented in FIG. 2 and show at 11 to 36 ppm the preferential formation of methylene groups with the central signal at 24 to 32 ppm with two guaiacyl units as a structure of the stabilized lignin.

Example 2

Figure 3:
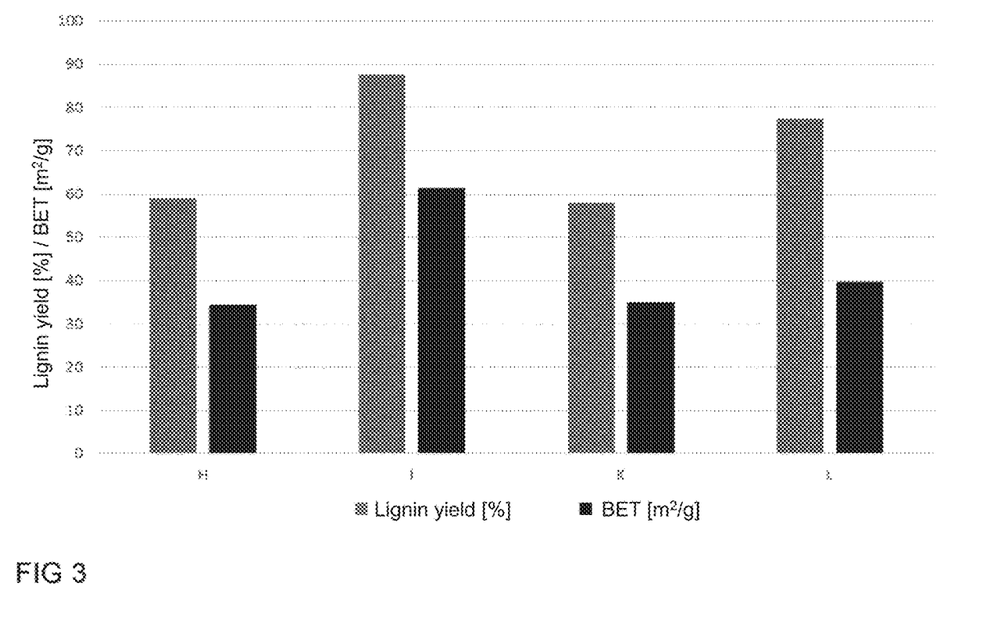
FIG. 3 shows a schematic representation of the results for a second embodiment according to exemplary embodiment 2.

The raw material for this example is LignoBoost lignin obtained from a black liquor from a kraft digestion. The solid was converted into a liquid containing the dissolved lignin through addition of water and sodium hydroxide solution. To each 30 g of a liquid containing dissolved lignin and having a dry matter content of 15% and a pH of 9.2 was added, in the first process step of reactions with the crosslinker formaldehyde, an amount of 23.5% formaldehyde solution as defined in Table 2. The liquid containing the dissolved lignin and the formaldehyde solution were homogenized and in the first process step treated for the times and temperatures stated in Table 2, producing a modified dissolved lignin, and then treated in the second process step, producing an undissolved stabilized lignin. The undissolved stabilized lignin was obtained by centrifugation. After washing twice with demineralized water and drying in an air-circulation drying oven, the yields given in Table 2 and FIG. 3 were obtained. The specific surface area (BET) in Table 2 and FIG. 3 of the undissolved stabilized lignin was determined after heating at 150° C. under reduced pressure.

The lignin used has 1.9 mmol/g of phenolic guaiacyl groups and 0.3 mmol/g of p-hydroxyphenyl groups and thus 2.5 mmol/g of crosslinkable units.

The formaldehyde used has 66.6 mmol of crosslinkable units per g of dry formaldehyde.

TABLE 2

Variants of the experiments in example 2 with varying additive concentrations

| No. | Crosslinker/ crosslinkable units in lignin [mol/mol] | Crosslinkable units in crosslinker/ crosslinkable units in lignin [mol/mol] | Crosslinker/ lignin [g/100 g lignin] | Temperature and time in first step | Temperature and time in second step | Yield [undissolved stabilized lignin/dissolved lignin in percent] | BET [m²/g] |
|---|---|---|---|---|---|---|---|
| H | 0 | 0 | 0 | 70-130° C., 12 min 50-180° C., 26 min | 225° C., 8 h | 59 | 34.4 |
| I | 1.0 | 2.0 | 8 | 70-130° C., 12 min 50-180° C., 26 min | 225° C., 8 h | 88 | 61.4 |
| K | 0 | 0 | 0 | 70-130° C., 12 min 50-180° C., 26 min | 225° C., 4 h | 58 | 35.0 |
| L | 2.0 | 3.9 | 16 | 70-130° C., 12 min 50-180° C., 26 min | 225° C., 4 h | 77 | 39.7 |

Figure 4:
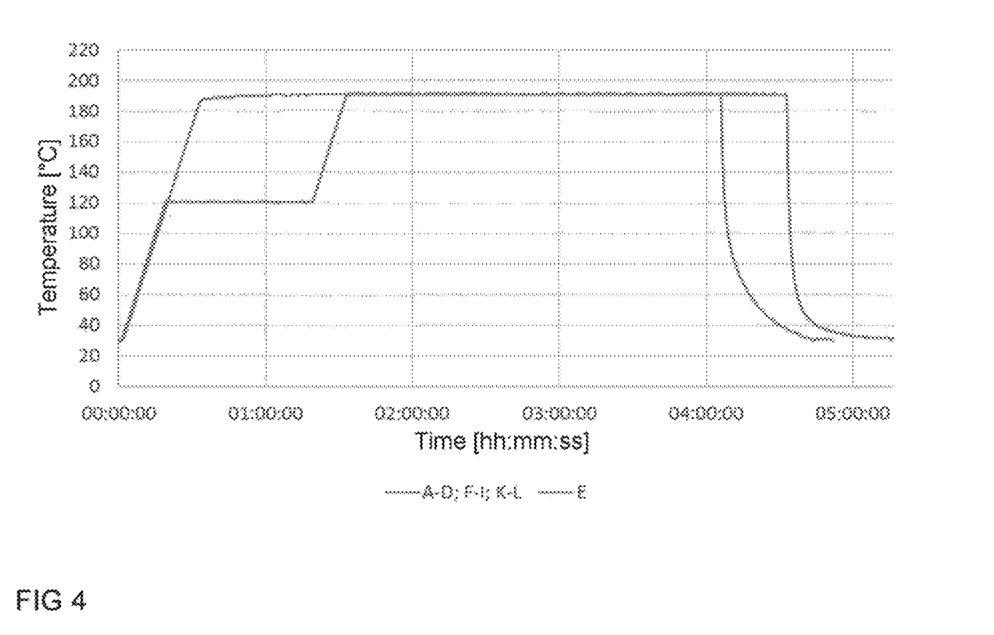
FIG. 4 shows a schematic representation of the temperature profiles from exemplary embodiments 1 and 2.

The temperature curves from examples 1 and 2 are summarized in the diagram in FIG. 4.

Example 3

The raw material for this example is LignoBoost lignin obtained from a black liquor from a kraft digestion. The solid was converted into a liquid containing the dissolved lignin through addition of water and sodium hydroxide solution.

To each 30 g of a liquid containing dissolved lignin and having a dry matter content of 15% and a pH of 8.7 was added, in the first process step of reactions with the crosslinker formaldehyde, an amount of 23.5% formaldehyde solution as defined in Table 3. The liquid containing the dissolved lignin and the formaldehyde solution were homogenized and in the first process step treated for the times and temperatures stated in Table 3, producing a modified dissolved lignin, and then treated in the second process step, producing an undissolved stabilized lignin. The undissolved stabilized lignin was obtained by filtration. After washing with demineralized water in an amount twice that of the filtrate and drying in an air-circulation drying oven, the yields given in Table 3 and FIG. 5 were obtained. The specific surface area (BET) in Table 3 and FIG. 5 of the undissolved stabilized lignin was determined after heating at 150° C. under reduced pressure.

The lignin used has 1.9 mmol/g of phenolic guaiacyl groups and 0.3 mmol/g of p-hydroxyphenyl groups and thus 2.5 mmol/g of crosslinkable units.

The formaldehyde used has 66.6 mmol of crosslinkable units per g of dry formaldehyde.

TABLE 3

Variants of the experiments in example 3 with varying additive concentrations

| No. | Crosslinker/ crosslinkable units in lignin [mol/mol] | Crosslinkable units in crosslinker/crosslinkable units in lignin [mol/mol] | Crosslinker/ lignin [g/100 g lignin] | Temperature and time in first step | Temperature and time in second step | Yield [undissolved stabilized lignin/ dissolved lignin in percent] | BET [m$^2$/g] |
|---|---|---|---|---|---|---|---|
| M | 0 | 0 | 0 | 70-130° C., 12 min 50-180° C., 26 min | 240° C., 4 h | 64.3 | 0.7 |
| N | 0.25 | 0.5 | 2 | 70-130° C., 12 min 50-180° C., 26 min | 240° C., 4 h | 76.8 | 20.5 |
| O | 0.5 | 1.0 | 4 | 70-130° C., 12 min 50-180° C., 26 min | 240° C., 4 h | 67.3 | 65.0 |
| P | 1.0 | 2.0 | 8 | 70-130° C., 12 min 50-180° C., 26 min | 240° C., 4 h | 80.6 | 88.6 |
| Q | 2.0 | 4.0 | 16 | 70-130° C., 12 min 50-180° C., 26 min | 240° C., 4 h | 83.2 | 91.0 |
| P2 | 1.0 | 2.0 | 8 | 70-130° C., 12 min 50-180° C., 26 min | 240° C., 4 h | 81.4 | 82.2 |

Figure 5:
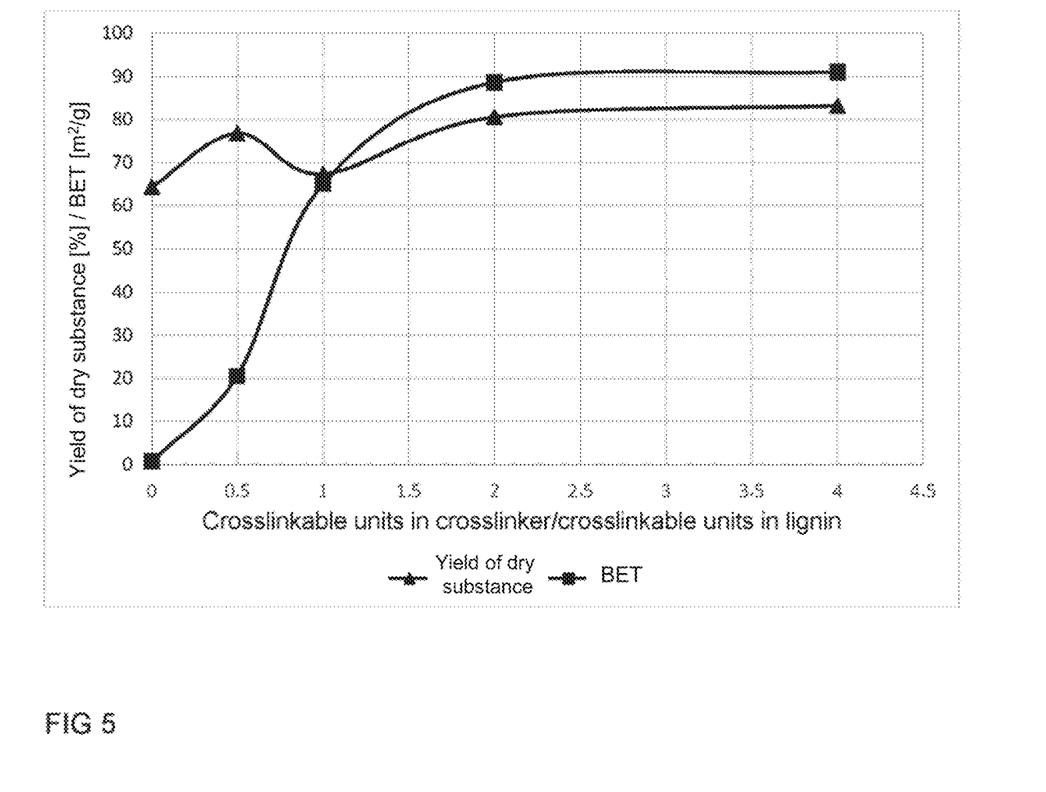
FIG. 5 shows a schematic representation for depicting the influence of the amount of the employed crosslinker on the yield and BET value of a stabilized lignin produced according to exemplary embodiment 3.

As can be seen from Table 3 above and FIG. 5, the yield and BET of the lignin material produced depend on the amount of crosslinker used.

Thus, examples M to Q show that the BET initially increases with increasing amount of crosslinker (examples M to P), but increasing the amount of crosslinker further does not result in any further increase in BET (example Q).

Thus an optimum clearly arises for the amount of crosslinker used.

Figure 6:
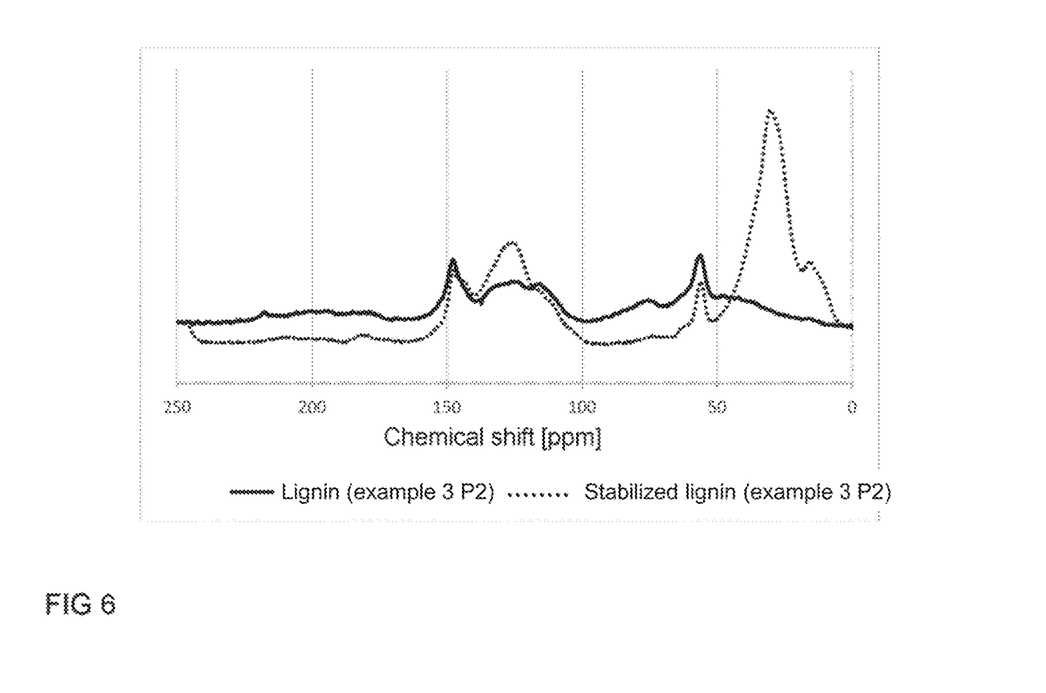
FIG. 6 shows a $^{13}$C-NMR spectrum of a stabilized lignin obtained according to exemplary embodiment 3.

In example P2, $^{13}$C-formaldehyde was used and analyzed by solid-state NMR spectroscopy. The spectra of the lignin used and stabilized lignin are presented in FIG. 6 and show at 11 to 35 ppm the preferential formation of methylene groups with the central signal at 24 to 32 ppm with two guaiacyl units as a structure of the stabilized lignin.

Example 4

The raw material for this example is LignoBoost lignin obtained from a black liquor from a kraft digestion. The solid was converted into a liquid containing the dissolved lignin through addition of water and sodium hydroxide solution.

To each 30 g of a liquid containing dissolved lignin and having a dry matter content of 15% and a pH of 9.0 was added, in the first process step of reactions with the crosslinker glyoxal, an amount of 40% glyoxal solution as defined in Table 4. The liquid containing the dissolved lignin and the glyoxal solution were homogenized and in the first process step treated for the times and temperatures stated in Table 4, producing a modified dissolved lignin, and then treated in the second process step, producing an undissolved stabilized lignin. The undissolved stabilized lignin was obtained by centrifugation. After washing twice with demineralized water and drying in an air-circulation drying oven, the yields given in Table 4 were obtained. The specific surface area (BET) in Table 4 of the undissolved stabilized lignin was determined after heating at 150° C. under reduced pressure.

The lignin used has 1.9 mmol/g of phenolic guaiacyl groups and 0.3 mmol/g of p-hydroxyphenyl groups and thus 2.5 mmol/g of crosslinkable units.

The glyoxal used has 68.9 mmol of crosslinkable units per g.

TABLE 4

Variants of the experiments in example 4 with varying additive concentrations

| No. | Crosslinker/ crosslinkable units in lignin [mol/mol] | Crosslinkable units in crosslinker/ crosslinkable units in lignin [mol/mol] | Crosslinker/ lignin [g/100 g lignin] | Temperature and time in first step | Temperature and time in second step | Yield [undissolved stabilized lignin/dissolved lignin in percent] | BET [m$^2$/g] |
|---|---|---|---|---|---|---|---|
| R | 0 | 0 | 0 | 70-130° C., 12 min 50-180° C., 26 min | 200° C., 4 h | 54.3 | 0.7 |

TABLE 4-continued

Variants of the experiments in example 4 with varying additive concentrations

| No. | Crosslinker/ crosslinkable units in lignin [mol/mol] | Crosslinkable units in crosslinker/ crosslinkable units in lignin [mol/mol] | Crosslinker/ lignin [g/100 g lignin] | Temperature and time in first step | Temperature and time in second step | Yield [undissolved stabilized lignin/dissolved lignin in percent] | BET [m²/g] |
|---|---|---|---|---|---|---|---|
| S | 1 | 3.9 | 14.3 | 70-130° C., 12 min 50-180° C., 26 min | 200° C., 4 h | 71.2 | 45.3 |

Example 5

The raw material for this example is LignoBoost lignin obtained from a black liquor from a kraft digestion. The solid was converted into a liquid containing the dissolved lignin through addition of water and sodium hydroxide solution.

To each 30 g of a liquid containing dissolved lignin and having a dry matter content of 15% and a pH of 9.0 was added, in the first process step of reactions with the crosslinker glyceraldehyde, an amount defined in Table 5. The liquid containing the dissolved lignin and the glyceraldehyde were homogenized and in the first process step treated for the times and temperatures stated in Table 5, producing a modified dissolved lignin, and then treated in the second process step, producing an undissolved stabilized lignin. The undissolved stabilized lignin was obtained by centrifugation. After washing twice with demineralized water and drying in an air-circulation drying oven, the yields given in Table 5 were obtained. The specific surface area (BET) in Table 5 of the undissolved stabilized lignin was determined after heating at 150° C. under reduced pressure.

The lignin used has 1.9 mmol/g of phenolic guaiacyl groups and 0.3 mmol/g of p-hydroxyphenyl groups and thus 2.5 mmol/g of crosslinkable units.

The glyceraldehyde used has 22.2 mmol of crosslinkable units per g.

TABLE 5

Variants of the experiments in example 5 with varying additive concentrations

| No. | Crosslinker/ crosslinkable units in lignin [mol/mol] | Crosslinkable units in crosslinker/ crosslinkable units in lignin [mol/mol] | Crosslinker/ lignin [g/100 g lignin] | Temperature and time in first step | Temperature and time in second step | Yield [undissolved stabilized lignin/dissolved lignin in percent] | BET [m²/g] |
|---|---|---|---|---|---|---|---|
| T | 0 | 0 | 0 | 70-130° C., 12 min 50-180° C., 26 min | 240° C., 4 h | 54.3 | 0.7 |
| U | 1 | 2 | 22.2 | 70-130° C., 12 min 50-180° C., 26 min | 240° C., 4 h | 75.3 | 48.5 |

Example 6

The raw material for this example is a lignosulfonate in the form of black liquor from the digestion with sulfite. The starting material was converted into a liquid containing the dissolved lignin through addition of water and sodium hydroxide solution. To each 30 g of a liquid containing dissolved lignin and having a dry matter content of 12.4% and a pH of 10.4 was added, in the first process step of reactions with the crosslinker formaldehyde, an amount of 23.5% formaldehyde solution as defined in Table 6. The liquid containing the dissolved lignin and the formaldehyde solution were homogenized and in the first process step treated for the times and temperatures stated in Table 6, producing a modified dissolved lignin, and then treated in the second process step, producing an undissolved stabilized lignin. The undissolved stabilized lignin was obtained by centrifugation. After washing twice with demineralized water and drying in an air-circulation drying oven, the yields given in Table 6 were obtained. The specific surface area (BET) in Table 6 of the undissolved stabilized lignin was determined after heating at 150° C. under reduced pressure.

The dry matter of the black liquor used has a lignin content of 70%. The lignin fraction of the dry matter used has 0.6 mmol/g of phenolic guaiacyl groups and thus crosslinkable units.

The formaldehyde used has 66.6 mmol of crosslinkable units per g of dry formaldehyde.

TABLE 6

Variants of the experiments in example 6 with varying additive concentrations

| No. | Crosslinker/ crosslinkable units in lignin [mol/mol] | Crosslinkable units in crosslinker/ crosslinkable units in lignin [mol/mol] | Crosslinker/lignin [g/100 g lignin] | Temperature and time in first step | Temperature and time in second step | Yield [undissolved stabilized lignin/dissolved lignin in percent] | BET [m$^2$/g] |
|---|---|---|---|---|---|---|---|
| V | 0 | 0 | 0 | 70-130° C., 12 min 50-230° C., 26 min | 230° C., 6 h | 58 | 7.0 |
| W | 4.3 | 8.6 | 7.7 | 70-130° C., 12 min 50-230° C., 26 min | 230° C., 6 h | 74 | 22.4 |

The invention claimed is:

1. A process for producing an undissolved stabilized lignin having a statistical thickness surface area (STSA) of at least 10 m$^2$/g from lignin-containing raw materials, the process comprising:
   reacting a lignin dissolved in a liquid and a crosslinker, thereby producing a dissolved modified lignin, and
   converting the dissolved modified lignin into an undissolved stabilized lignin at a temperature of at least 150° C.

2. The process as claimed in claim 1, wherein:
   the lignin contains phenolic aromatics, aromatic and aliphatic hydroxy groups and/or carboxy groups as crosslinkable units, and the crosslinker contains at least one functional group as a crosslinkable unit that can react with the crosslinkable units in the lignin, wherein the lignin and the crosslinker are reacted at a first temperature T1 that is less than or equal to a first maximum temperature T1max and greater than or equal to a first minimum temperature T1min for a defined period of time, thereby producing the dissolved modified lignin, and
   the dissolved modified lignin is converted into the undissolved stabilized lignin at a second temperature T2 that is less than or equal to a second maximum temperature T2max and greater than or equal to a second minimum temperature T2min for a defined period of time, wherein the second temperature T2min is at least 150° C.

3. The process as claimed in claim 1, wherein an amount of the crosslinker reacted with the lignin corresponds to a maximum of 4 mol of crosslinkable units in the crosslinker per mole of crosslinkable units in the lignin.

4. The process as claimed claim 1, wherein an amount of the crosslinker reacted with the lignin corresponds to at least 0.5 mol of crosslinkable units in the crosslinker per mole of crosslinkable units in the lignin used.

5. The process as claimed claim 1, wherein converting the dissolved modified lignin into the undissolved stabilized lignin is performed at a temperature of less than 270° C.

6. The process as claimed claim 1, wherein a pH of the liquid containing the dissolved modified lignin is above a pH of the liquid containing the undissolved stabilized lignin.

7. A process for producing an undissolved stabilized lignin having a statistical thickness surface area (STSA) of at least 10 m$^2$/g from lignin-containing raw materials, the process comprising:
   reacting a lignin dissolved in a first liquid, the lignin containing phenolic aromatics, aromatic and aliphatic hydroxy groups and/or carboxy groups as crosslinkable units, and a crosslinker, the crosslinker containing at least one functional group as a crosslinkable unit that can react with the crosslinkable units in the lignin, and an amount of crosslinkable units in the crosslinker being greater than or equal to 0.5 and less than or equal to 4 mol per mol of crosslinkable units in the lignin, thereby producing a dissolved modified lignin in a second liquid, and
   converting the dissolved modified lignin into an undissolved stabilized lignin in a third liquid at a second temperature T2 that is less than or equal to a second maximum temperature T2max and greater than or equal to a second minimum temperature T2min for a defined period of time, wherein the second temperature T2min is at least 150° C.

8. The process as claimed claim 7, wherein the amount of crosslinker is a maximum of 35 g/100 g lignin.

9. The process as claimed in claim 7, wherein the crosslinker comprise aldehydes or bifunctional compounds.

10. The process as claimed claim 7, wherein the reacting of the lignin with the crosslinker is conducted at a temperature more than 50° C. and less than 180° C.

11. The process as claimed in claim 7, wherein an average residence time for the reacting of the lignin with the crosslinker is at least 5 minutes and less than 300 minutes.

12. The process as claimed in claim 7, wherein the second maximum temperature T2max is 270° C.

13. The process as claimed in claim 7, wherein an average residence time for the converting of the dissolved modified lignin is at least 10 minutes, and less than 600 minutes.

14. The process as claimed in claim 7, further comprising prior to the reacting, dissolving the lignin in the first liquid having a pH of at least 7.5 and above the pH of the second liquid containing the dissolved modified lignin.

15. The process as claimed in claim 7, wherein a pH of the second liquid containing the modified dissolved lignin is at least 7 and above the pH of the third liquid containing an undissolved stabilized lignin.

16. The process as claimed in claim 7, wherein:
a carbohydrate-based crosslinker, is obtained from carbohydrates dissolved or dispersed in the first liquid containing the dissolved lignin, and
the lignin dissolved in the first liquid and the carbohydrate-based crosslinker are reacted, thereby producing the dissolved modified lignin.

17. The process as claimed in claim 7, wherein:
a lignin-based crosslinker is obtained from the lignin dissolved or dispersed in the first liquid containing the dissolved lignin, and
remaining lignin dissolved in the liquid and the lignin-based crosslinker are reacted, thereby producing the dissolved modified lignin.

\* \* \* \* \*